10

United States Patent Office 3,015,680
Patented Jan. 2, 1962

3,015,680
PROCESS FOR THE MANUFACTURE OF CAROTENE COMPOUNDS
Otto Isler, Marc Montavon, and Rudolf Rüegg, Basel, and Paul Zeller, Neuallschwil, near Basel, Switzerland, assignors to Hoffmann-La Roche Inc., Nutley, N.J., a corporation of New Jersey
No Drawing. Filed June 21, 1956, Ser. No. 592,758
Claims priority, application Switzerland June 27, 1955
4 Claims. (Cl. 260—666)

The present invention relates to a novel process for the manufacture of carotene compounds, more particularly to the manufacture of 15,15'-dehydro-β-carotene and β-carotene.

The hitherto known syntheses of β-carotene invariably start from β-ionone. In a first synthesis according to Inhoffen this starting compound was used for synthesizing first a $C_{19}$-aldehyde which was added to acetylene dimagnesium bromide at both ends thereof $$(C_{19}+C_2+_{19}=C_{40})$$

A further synthesis according to Inhoffen is based on the building scheme $C_{18}+C_4+C_{18}=C_{40}$ in which two molecules of β-$C_{18}$-ketone are linked together by diacetylene. The other syntheses start from $C_{16}$-acetylene compounds and octen-(4)-dione-(2,7). In all these syntheses $C_{40}$-acetylene diols or tetrols are formed as intermediates which must be dehydrated by cumbersome methods often resulting in very poor yields.

It has now been discovered that it is advantageous to build up the carbon skeleton of carotene by the new building scheme $C_{10}+C_{20}+C_{10}=C_{40}$ without formation of hydroxylated intermediates.

The present invention thus relates to a new process for the manufacture of carotene compounds which comprises condensing 1-bromomethyl-2,6,6-trimethyl-1-cyclohexene (e.g. β-cyclogeranyl bromide) with triaryl-phosphine in which the aryl groups may carry alkyl or alkoxy radicals, thereby producing a phosphonium bromide of the formula

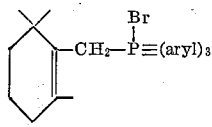

reacting the latter with phenyllithium, thereby producing β-cyclogeranylidene-triaryl-phosphine; and condensing the latter with a dialdehyde selected from the group consisting of 2,6,11,15 - tetramethyl-2,4,6,10,12,14-hexadecahexaen-8-yne-1,16-dial and 2,6,11,15-tetramethyl-2,4,6,-8,10,12,14-hexadecaheptaene-1,16-dial.

In the first stage of the comprehensive process 1-bromomethyl - 2,6,6-trimethyl-1-cyclohexene is condensed with a triaryl-phosphine, preferably triphenylphosphine. The condensation is advantageously effected by mixing the reactants in an inert organic medium, such as benzene, until the condensation has been completed; usually after a somewhat extended reaction period of the order of two days. Preferably, the triarylphosphine is employed in slight molar excess, in relation to the bromo reactant. At the end of the condensation reaction, the phosphonium bromide product, i.e. triaryl-[(2,6,6-trimethyl-1-cyclohexen-1-yl)methyl] - phosphonium bromide, is filtered off, washed and dried.

In the next stage of the comprehensive process referred to, the phosphonium bromide intermediate is treated in order to split out hydrogen bromide therefrom. This reaction is advantageously effected by suspending the phosphonium bromide in an anhydrous ether, e.g. absolute diethyl ether, mixing the suspension with the stoichiometric quantity of an ethereal solution of phenyllithium or butyllithium, and heating the suspension. Upon heating, the suspended phosphonium salt goes into solution and there results a deep red- to brown-colored solution of the triaryl-cyclogeranylidene - phosphine, which solution can be used directly for the next stage of the process.

In said next stage, the solution of the triaryl-[(2,6,6-trimethyl-1-cyclohexen-1-yl)methylidene] - phosphine is condensed with a $C_{20}$ dialdehyde; and the resulting adduct or condensation product is decomposed by splitting out two molar proportions of triarylphosphine oxide therefrom. An advantageous mode of effecting this stage of the process comprises mixing the dialdehyde reactant with about two molar proportions (or preferably a slight excess thereover) of the triaryl-cyclogeranylidene-phosphine intermediate, in an inert organic liquid, such as diethyl ether, petroleum ether, benzene, dioxan, tetrahydrofuran and the like. Advantageously, the triaryl-cyclogeranylidene-phosphine and the $C_{20}$-dialdehyde reactant are mixed at room temperature or at moderately elevated temperature, taking precautions to exclude oxygen, for example by displacing the oxygen with an inert gas such as nitrogen. The condensation reaction is an exothermic reaction, which takes place practically instantaneously upon addition of a solution of the dialdehyde reactant to a solution of the phosphine reactant. Depending upon the specific identity and quantity of the solvent media, the adduct or condensation product remains in solution or precipitates; in the latter case the color of the solution becomes lighter. In a preferred mode of execution, the dialdehyde reactant, in solution in methylene chloride, is added to a suspension or solution of the phosphine reactant; in such manner that at least the dialdehyde reactant and the resulting adduct are both in dissolved state. The adduct decomposes, gradually if allowed to stand in solution, and more quickly if its solution is heated, resulting in the formation of the $C_{40}$ carotenoid and of triarylphosphine oxide as a byproduct. The decomposition can be effected very easily, preferably by heating the adduct, in solution in methylene chloride, for several hours at a moderately elevated temperature, e.g. 40°–50° C. At the end of the decomposition reaction, the $C_{40}$ carotenoid formed can be obtained by shaking the organic phase with water and filtering off the triarylphosphine oxide, the $C_{40}$ carotenoid being obtained by crystallization from the filtrate, after drying and concentrating the latter. If desired, the carotenoid product can be freed of any contaminating organic phosphorus compounds by recrystallization, partition between solvents, or chromatography. An advantageous method of purifying the $C_{40}$ carotenoid comprises mixing the filtrate, above referred to, with a large quantity of ethanol or methanol, whereupon the carotenoid precipitates in crystalline form, while the byproducts remain in solution. If the carotenoid product contains a triple bond at the 15,15' position, the latter can be partially hydrogenated and the hydrogenation product can be isomerized to the trans form by methods known per se. For example, 15,15'-dehydro-β-carotene can be catalytically hydrogenated, in an inert solvent such as ethyl acetate, toluene or petroleum ether, in the presence of a selective hydrogenation catalyst, e.g., a palladium-lead catalyst in the presence of quinoline, of the type disclosed in the publication Helvetica Chimica Acta, 35, 446 (1952). The 15,15'-cis compound formed by the hydrogenation operation can be isomerized to the corresponding trans compound by any of the known methods for effecting this type of isomerization, preferably by heating a solution of the 15,15'-cis compound.

In one of its embodiments, the invention provides a process for the preparation of β-carotene which comprises condensing 1-bromomethyl-2,6,6-trimethyl-cyclohexene with triphenylphosphine, thereby producing triphenyl - [(2,6,6 - trimethyl - 1 - cyclohexen - 1 - yl)-methyl]-phosphonium bromide; reacting the latter with phenyllithium, thereby producing triphenyl-[(2,6,6-trimethyl-1-cyclohexen-1-yl)-methylidene]-phosphine; condensing the latter with 2,6,11,15-tetramethyl-2,4,6,10,12,14-hexadecahexaen-8-yne-1-,16-dial and decomposing the resulting adduct, thereby producing 15,15'-dehydro-β-carotene; hydrogenating the latter, thereby producing 15,15'-cis-β-carotene; and isomerizing the 15,15'-cis linkage of the latter to a trans linkage.

In another of its embodiments, the invention provides a process which comprises partially hydrogenating 2,6,11,15 - tetramethyl - 2,4,6,10,12,14 - hexadecahexaen - 8-yne-1-,16-dial, thereby producing 2,6,11,15-tetramethyl-2,4,6,8,10,12,14 - hexadecaheptaene - 1,16 - dial; and condensing the latter with triphenyl-[(2,6,6-trimethyl-1-cyclohexen-1-yl)methylidene]-phosphine and decomposing the resulting adduct, thereby producing all-trans-β-carotene.

The invention is further illustrated by the following examples, which are illustrative but not limitative thereof. Temperatures are stated in degrees centigrade, uncorrected.

Example 1

Over a period of one hour, 5.2 g. of 1-bromomethyl-2,6,6-trimethyl-1-cyclohexene (β-cyclogeranyl bromide) was added, with stirring, to a solution of 7 g. of triphenylphosphine in 40 ml. of benzene, at room temperature. The reaction mixture was stirred for 48 hours after all the bromo reactant had been added. The solid material formed was filtered off, washed with benzene and petroleum ether in turn, then was dried at 40° under a water pump vacuum. 7.5 g. of the triphenyl-[(2,6,6-trimethyl-1-cyclohexen-1-yl)methyl] - phosphonium bromide so obtained (M.P. 90–93°) was suspended in 80 ml. of absolute diethyl ether and reacted with a solution of 1.2 g. of phenyllithium in 15 ml. of absolute diethyl ether, by heating and stirring. The suspended material lost hydrogen bromide and dissolved to form a deep red solution of triphenyl-[(2,6,6-trimethyl - 1 - cyclohexen - 1-yl)methylidene]-phosphine, which was diluted by addition of a further quantity of absolute diethyl ether to a total volume of 100 ml. and used directly for the procedure described in the next paragraph.

To the deep red solution of triphenyl-[(2,6,6-trimethyl-1-cyclohexen-1-yl)methylidene]-phosphine in 100 ml. of absolute diethyl ether, obtained as described above, was added dropwise, while stirring and in a nitrogen atmosphere, a solution of 2 g. of 2,6,11,15-tetramethyl-2,4,6,10,12,14-hexadecahexaen-8-yne-1,16-dial in 200 ml. of dry benzene. From a solution, which at first was dark brown, there precipitated a red-brown material, which upon heating at 60° for about six hours was partially redissolved. The warm solution was filtered and washed with benzene until the eluate was only weakly colored. The filtrate was washed neutral with water, dried over sodium sulfate and concentrated in vacuo. The residue was mixed with ethanol, thereby precipitating 15,15'-dehydro-β-carotene in fine leaflets. The material was recrystallized from methylene chloride, resulting in a purified product of M.P. 156°, U.V. maxima at 432 mµ and 456 mµ, $E_1^1$ 2015 and 1665

(in petroleum ether). The 15,15'-dehydro-β-carotene was converted to 15,15'-mono-cis-β-carotene by catalytic hydrogenation in petroleum ether in the presence of a palladium catalyst partially inactivated with quinoline and lead (as specifically disclosed in Helvetica Chimica Acta, 35 (1952), at page 450). The hydrogenation ceased upon uptake of one molar proportion of hydrogen. The reaction mixture was filtered, and the filter cake was dissolved in methylene chloride. The catalyst, which remained insoluble in methylene chloride, was filtered off, and the filtrate was concentrated, thereby precipitating 15,15'-mono-cis-β-carotene, M.P. 150°–151°. The latter was isomerized, by heating at 80° in petroleum ether, to all-trans-β-carotene, M.P. 180°, U.V. maxima at 453 mµ and 480 mµ, $E_1^1$ 2560 and 2230

(in petroleum ether).

The $C_{20}$ dialdehyde, 2,6,11,15-tetramethyl-2,4,6,10,12,14-hexadecahexaen-8-yne-1,16-dial, used as a reactant in this example, was prepared as follows:

10 g. of 2,7-dimethyl-2,6-octadien-4-yne-1,8-diol was dissolved in 1500 ml. of dry acetone; 150 g. of manganese dioxide (prepared according to J. Chem. Soc., 1952, 1094) was added and the mixture was shaken mechanically for 2 hours. The manganese dioxide was sucked off, washed with acetone until the filtrate ran off nearly colorless, and then the yellow acetone solution was concentrated in vacuo. Approximately 9.7 g. of a solid, yellow residue was obtained, which was recrystallized from ether/petroleum ether. The 2,7-dimethyl-2,6-octadien-4-yne-1,8-dial had M.P. 68°; ultra-violet maxima in ethanol at 314 mµ ($\epsilon$=29,000) and 330 mµ ($\epsilon$=26,200).

To a hot solution of 40 g. of 2,7-dimethyl-2,6-octadien-4-yne-1,8-dial in 120 g. of ethyl orthoformate was added a hot solution of 4 g. of ammonium nitrate in 50 ml. of absolute ethanol, and the mixture was allowed to stand for 48 hours, the mixture thus gradually reaching room temperature. Then the reaction mixture was taken up in diethyl ether, washed with dilute aqueous sodium bicarbonate solution and dried over potassium carbonate. After concentration of the ether solution, the excess of ethyl orthoformate as well as ethyl formate produced by reaction was removed from the condensation product in vacuo. By distillation in a high vacuum there was obtained pure 2,7-dimethyl-2,6-octadien-4-yne-1,8-tetraethyldiacetal, B.P. 122° to 127° at 0.03 mm.; $n_D^{24}$ 1.4892; ultraviolet maxima: 273 mµ, $\epsilon$=27,200, and 288 mµ, $\epsilon$=22,600 (in conc. ethanol).

To a mixture of 102 g. of 2,7-dimethyl-2,6-octadien-4-yne-1,8-tetraethyldiacetal and 0.5 ml. of boron trifluoride etherate was gradually added 47 g. of ethyl vinyl ether, while stirring. The rate of addition was so adjusted that the reaction temperature was maintained between 30° and 35°. The mixture was stirred for a further period of 3 hours at 35°, and was then taken up in diethyl ether, washed with dilute aqueous sodium hydroxide solution and dried over potassium carbonate. After concentration of the ether solution, 137 g. of crude 3,10 - diethoxy - 4,9 - dimethyl - 4,8 - dodecadien - 6 - yne-1,12-tetraethyldiacetal was obtained. The compound, after purification by distillation in a high vacuum, had B.P. 160°–161° at 0.03 mm.; $n_D^{29}$ 1.4778; ultraviolet maxima: 274 mµ, $\epsilon$=26,200, and 290 mµ, $\epsilon$=23,400 (in conc. ethanol).

In order to hydrolyze the above diacetal, the 137 g. of crude 3,10 - diethoxy-4,9-dimethyl-4,8-dodecadien-6-yne-1,12-tetraethyldiacetal was dissolved in a mixture of 800 ml. of dioxan, 200 ml. of water and 35 ml. of syrupy phosphoric acid (containing 87% by weight $H_3PO_4$) and a trace of hydroquinone was added thereto. The mixture was boiled for 7 hours under a nitrogen atmosphere, during which period a mixture of dioxan, ethanol and water was slowly distilled off through a column packed with Raschig rings. The reaction volume was maintained constant by dropwise addition of a mixture of dioxan and water. The hot reaction mixture was then poured, with stirring, into 2000 ml. of ice water. Immediately 4,9-dimethyl - 2,4,8,10 - dodecatetraen-6-yne-1,12-dial precipitated in crystalline form. The precipitate was sucked off and washed well with water. After recrystallization from ethyl alcohol and drying in vacuo, 45 g. of the pure compound, M.P. 165° C., was obtained.

To a warm solution of 30 g. of 4,9-dimethyl-2,4,8,10-dodecatetraen-6-yne-1,12-dial in 100 g. of ethyl orthoformate was added a warm solution of 2 g. of ammonium nitrate in 100 ml. of absolute ethanol, and the mixture was heated until, on dilution, crystals of starting material no longer separated. The reaction mixture was then taken up in diethyl ether, and the solution was washed with dilute aqueous sodium bicarbonate solution and dried over potassium carbonate. After concentration of the ether solution, the excess ethyl orthoformate as well as ethyl formate formed by reaction, were separated from the reaction mixture in vacuo. The residue was distilled in a high vacuum, yielding 4, 9-dimethyl-2,4,8,10 - dodecatetraen-6-yne - 1,12 - tetraethyldiacetal, M.P. 181°/0.04 mm.; $n_D^{27}$ 1.57; ultraviolet maxima: $330\mu$, $\epsilon=46400$, and $350\mu$, $\epsilon=48300$ (in ethanol).

To 45 g. of 4,9-dimethyl-2,4,8,10-dodecatetraen-6-yne-1,12-tetraethyldiacetal and 0.5 g. of boron trifluoride etherate was added gradually, with stirring, 80 g. of ethyl propenyl ether. The rate of addition was so adjusted that the reaction temperature was maintained between 30° and 35°. Stirring was continued for 3 hours at 35°. Then the reaction mixture was taken up in diethyl ether, and the solution was washed with dilute aqueous sodium hydroxide solution and dried over potassium carbonate. Concentration of the ethereal solution yielded crude 3,14 - diethoxy - 2,6,11,15 - tetramethyl-4,6,10,12 - hexadecatetraen-8-yne-1,16-tetraethyldiacetal, which had two absorption maxima in the ultraviolet spectrum, at $330\mu$ and $350\mu$ (in ethanol).

In other to effect hydrolysis, the crude 3,14-diethoxy-2,6,11,15 - tetramethyl - 4,6,10,12-hexadecatetraen-8-yne-1,16-tetraethyldiacetal was dissolved in a mixture of 300 ml. of dioxan, 60 ml. of water and 10 ml. of syrupy (87%) phosphoric acid, and a small amount of hydroquinone was added. The mixture was boiled under nitrogen for 7 hours; a mixture of dioxan, alcohol and water being thus distilled off from the reaction mixture through a column packed with Raschig rings. The volume of the reaction mixture was maintained constant by dropping a mixture of dioxan and water into the reaction mixture. The hot reaction mixture was then poured into ice water, with stirring, the 2,6,11,15-tetramethyl - 2,4,6,10,12,14 - hexadecahexaen-8-yne-1,16-dial thus precipitating immediately in crystalline form. The precipitate was filtered with suction and thoroughly washed with water. The pure dialdehyde, having a melting point of 190° to 192°, was obtained by recrystallization from a mixture of benzene and petroleum ether.

*Example 2*

50 g. of 2,6,11,15-tetramethyl-2,4,6,10,12,14-hexadecahexaen-8-yne-1,16-dial was suspended in 600 ml. of toluene. 10 g. of a Pd—Pb—CaCO₃ catalyst (as specifically disclosed in Helvetica Chimica Acta, 35, 446 (1952), at page 450) and 5 ml. of quinoline were added. The solution was reacted with elemental hydrogen, at room temperature and a very slight hydrogen overpressure, until the uptake of hydrogen ceased. The hydrogenation mixture was filtered, and the filter cake (containing catalyst and hydrogenation product) was washed with acetone in order to extract the hydrogenation product. The acetone solution yielded approximately 40 g. of 2,6,11,15-tetramethyl - 2,4,6,8,10,12,14-hexadecaheptaene - 1,16 - dial, M.P. 190°–191°, ultraviolet maxima at 408, 430 and $458\mu$, $E_1^1$ 2930, 5240 and 5820

(in petroleum ether).

To a deep red solution of triphenyl-[(2,6,6-trimethyl-1-cyclohexen-1-yl)methylidene]-phosphine in 100 ml. of absolute diethyl ether (obtained precisely as described in Example 1 above) was added dropwise, over a period of five minutes, while stirring and in a nitrogen atmosphere, a solution of 2 g. of 2,6,11,15-tetramethyl-2,4,6,-8,10,12,14-hexadecaheptaen-1,16-dial in 50 ml. of methylene chloride. The reaction mixture was stirred for an additional period of 15 minutes at 30° and then was refluxed for five hours. At the end of this time 60 ml. of methanol was added to the warm reaction mixture and the whole was cooled to 10° while stirring. The crystal slurry was filtered in a carbon dioxide atmosphere and the filter cake of crude β-carotene was washed with 20 ml. of methanol. The crude β-carotene was dissolved in 30 ml. of methylene chloride, taking care that the temperature did not exceed 40°, and then was precipitated from the warm methylene chloride solution by adding thereto 50 ml. of methanol and cooling for two hours with ice water. The slurry was filtered in a carbon dioxide atmosphere, the filter cake was washed with methanol and was then dried at 40° in vacuo. There was obtained all-trans-β-carotene, identical with that obtained in Example 1 above.

We claim:

1. A process which comprises condensing 1-bromomethyl-2,6,6-trimethyl-1-cyclohexene with triarylphosphine, thereby producing a triaryl-[(2,6,6-trimethyl-1-cyclohexen-1-yl)methyl]-phosphonium bromide; reacting the latter with phenyllithium, thereby producing a triaryl-[(2,6,6-trimethyl-1-cyclohexen-1-yl)-methylidene] - phosphine; and condensing the latter with a dialdehyde selected from the group consisting of 2,6,11,15-tetramethyl-2,4,6,10,12,14-hexadecahexaen-8-yne-1,16-dial and 2,6,11,15-tetramethyl-2,4,6,8,10,12,14 - hexadecaheptaene - 1,16-dial.

2. A process for the preparation of β-carotene which comprises condensing 1-bromomethyl-2,6,6-trimethyl-1-cyclohexene with triphenylphosphine, thereby producing triphenyl - [(2,6,6-trimethyl-1-cyclohexen-1-yl)methyl]-phosphonium bromide; reacting the latter with phenyllithium thereby producing triphenyl-[(2,6,6-trimethyl-1-cyclohexen-1-yl)methylidene]-phosphine; condensing the latter with 2,6,11,15-tetramethyl-2,4,6,10,12,14-hexadecahexaen-8-yne-1,16-dial and decomposing the resulting adduct, thereby producing 15,15'-dehydro-β-carotene; partially hydrogenating the latter, thereby producing 15, 15'-cis-β-carotene; and isomerizing the 15,15'-cis linkage of the latter to a trans linkage.

3. A process which comprises partially hydrogenating 2,6,11,15-tetramethyl-2,4,6,10,12,14 - hexadecahexaen - 8-yne-1,16-dial, thereby producing 2,6,11,15-tetramethyl-2,4,6,8,10,12,14-hexadecaheptaene-1,16 - dial; and condensing the latter with triphenyl-[(2,6,6-trimethyl-1-cyclohexen-1-yl)methylidene]-phosphine and decomposing the resulting adduct, thereby producing all-trans β-carotene.

4. A process for the production of beta-carotene which comprises condensing beta-cyclogeranyl bromide with triphenylphosphine, thereby producing beta-cyclogeranyl-triphenylphosphonium bromide; reacting the latter with phenyl-lithium to produce triphenyl-(2,6,6-trimethyl-1-cyclohexen-1-yl)-methylidene phosphine; and condensing the latter with 2,6,11,15-tetramethylhexadecaheptaene-(2,4,6,8,10,12,14)-dial-(1,16) and removing the triphenyl phosphine oxide from the reaction mixture.

References Cited in the file of this patent

UNITED STATES PATENTS

| | | |
|---|---|---|
| 2,437,797 | Walling | Mar. 16, 1948 |
| 2,584,112 | Brown | Feb. 5, 1952 |
| 2,609,396 | Inhoffen et al. | Sept. 2, 1952 |
| 2,671,112 | Inhoffen et al. | Mar. 2, 1954 |
| 2,687,437 | Oppegard | Aug. 24, 1954 |
| 2,745,877 | Bindler et al. | May 15, 1956 |
| 2,775,626 | Schaaf et al. | Dec. 25, 1956 |

OTHER REFERENCES

Gridgeman: Chemistry and Industry (British), vol. 37, Sept. 13, 1947, pp. 555–58.

Kosolapoff: Organo-phosphorus Compounds (1950), J. Wiley & Sons, New York, N.Y., pp. 28, 78, 84 and 85 only.

Wittig et al.: Liebigs Annalen der Chemie, vol. 580, January 1953, p. 48.